T. S. HAMILTON.

LUBRICATING STRIP FOR LEAF SPRINGS.

APPLICATION FILED DEC. 3, 1919.

Reissued June 1, 1920. 14,870.

Inventor
Thomas S. Hamilton,

By Ch. Parker

Attorney

UNITED STATES PATENT OFFICE.

THOMAS S. HAMILTON, OF KANSAS CITY, MISSOURI, ASSIGNOR OF ONE-HALF TO WILLIAM E. MERRILL, OF KANSAS CITY, MISSOURI.

LUBRICATING-STRIP FOR LEAF-SPRINGS.

14,870. Specification of Reissued Letters Patent. Reissued June 1, 1920.

Original No. 1,323,856, dated December 2, 1919. Serial No. 320,683, filed August 29, 1919. Application for reissue filed December 3, 1919. Serial No. 342,236.

*To all whom it may concern:*

Be it known that I, THOMAS S. HAMILTON, a citizen of the United States, residing at Kansas City, in the county of Jackson and State of Missouri, have invented certain new and useful Improvements in Lubricating-Strips for Leaf-Springs, of which the following is a specification.

This invention relates to new and useful improvements in a lubricating strip for leaf springs and method of producing the same.

Heretofore lubrication of leaf springs has generally been accomplished by separating the leaves of the spring and placing oil between the same with an oil can or the like. An effort has been made to produce a lubricating strip which may be placed between the leaves of the spring affording a continuous oil supply therefor but all of these strips with which I am familiar have been formed of compressible material soaked with a lubricating agent. The feature of compressibility is an undesirable one in that the compressibility of the strip allows play in the spring and causes it to become loose and break. Also when this carrier strip has been subjected to continuous action for some time, it becomes so compressed that it slips out between the leaves of the spring.

The use of a ready flowing lubricant in such a carrier is highly undesirable in that the action of the spring squeezes the oil from the carrier and it collects upon the edges of the spring and dirt and dust from the road adhere thereto. Then in cleaning the spring to remove the grease it is necessary to use gasolene and this use of gasolene has a tendency to destroy the lubricating properties of the lubricant in the strip. Graphite has been placed upon the face of these compressible strips but in the presence of oil, graphite has a tendency to become a gummy mass, which due to its adhesive properties has a tendency to retard rather than promote free movement of the spring.

Also in the majority of cases where such a strip is used in order to hold the strip in place it is necessary that it must be continuous throughout the leaf of the spring and the spring therefore must be taken apart to insert the strip.

These objections I have overcome by forming a very thin strip provided upon one side with an adhesive to secure it to the spring. Upon the other side of the strip is placed a composition extremely hard in texture yet having a high coefficient of lubrication.

Other objects and advantages of the invention will be apparent during the course of the following description.

In the accompanying drawings forming a part of this specification, and in which like numerals are employed to designate like parts throughout the same:

Figure 1:
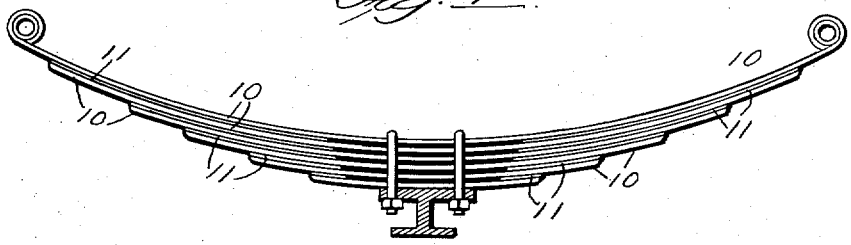
Figure 1 is a side elevation of a spring embodying my invention.
Figure 2:
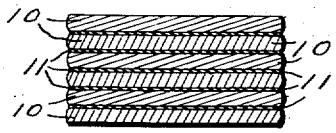
Fig. 2 is an enlarged transverse section therethrough.
Figure 4:
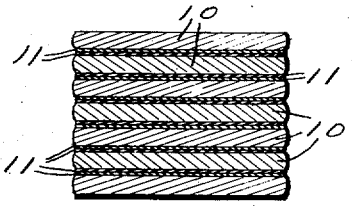
Fig. 4 is a sectional view illustrating the construction used where the strips are applied to both the upper and under surfaces of the spring, and, Fig. 5 is a longitudinal section of the doubled strip.
Figure 3:
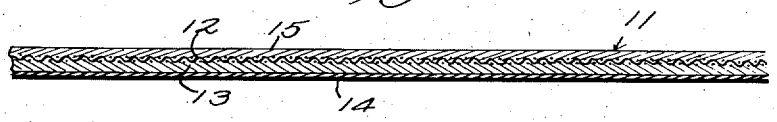
Fig. 3 is an enlarged section through the lubricating strip.

Referring now more particularly to the drawings, the numeral 10 indicates the leaves of a spring and the numeral 11 the lubricating strip placed intermediate these leaves.

The strip 11 is formed by placing upon one face of a layer 12 of fabric, such as top cloth, such as is ordinarily used for automobile tops, oil-cloth, paper, canvas, hair cloth, wire gauze, or the like, a paste comprising the following ingredients:

| | |
|---|---|
| A binder, viz.—shellac, silicate of soda, varnish, glue or the like | 1 qt. |
| A dry lubricant, viz.—fine powdered graphite, mica or soapstone | 1 lb. |
| Powdered alum | 1 oz. |

The paste is applied to the surface of the fabric in a smooth even layer 13 and then upon the surface of the paste I sprinkle one-quarter lb. heavy flake graphite in a thin layer 14. The strip is then put under pressure in a warm press for approximately twenty minutes, and then baked in an oven for a period of about four hours. It is to be understood that I do not limit myself to any specific heat or time for baking the composition, as in some cases it may be desirable to form a harder product than in others and the hardness of the product depends entirely upon the length of time it is baked.

This fabric is then cut into strips of the size desired for the spring to which it is to be applied and an adhesive 15 applied to the opposite side thereof.

This process forms a very hard thin strip and the graphite applied to the face of the composition tends to fill the minor roughness of the leaf.

The strip is then placed between the leaves of the spring by prying each apart and placing the strip between the same, the strip terminating short of the center of the spring. The gummed side of the strip adheres to the face of the leaf against which it is placed and prevents shifting of the strip, while the side bearing the composition provides a smooth dry lubricating surface for the shifting of the spring. In some cases it may be desirable to place two strips between each leaf with the faces bearing the lubricant together so that the friction lies between the surfaces of the strips and not between the strip and the spring.

Figure 5:
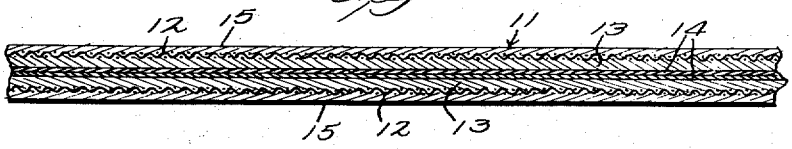

Under some conditions, I find it advantageous to use a double lubricating strip between each pair of spring leaves, and such a strip is shown in Fig. 5 of the drawings. When such a strip is to be used, two single strips are prepared, as described above, and one is placed on top of the other with the layers of graphite 14 disposed on one another. The two layers of adhesive 15 are then secured to the adjacent faces of the leaves of the spring. The gummed sides of the strips adhere to the faces of the leaves to prevent shifting of the strip, while the sides bearing the composition provide smooth dry lubricating surfaces for the shifting of the adjacent leaves of the spring.

As shown, the lubricating strips terminate short of the center of the spring. In an ordinary spring construction, and in spring construction shown in the prior art wherein lubricating strips are provided, the leaves of the spring, or the spring leaves, and the lulubricating strips are tightly compressed by the U-shaped bolts, or other fastening means employed to fasten this spring to the axle of the vehicle. The result is that relative movement of the leaves of the spring is prevented, and the entire spring moves as a unit and shocks and jars are transmitted to the body of the vehicle.

In the present invention, the lubricating strips 11 terminate short of the center of the spring, as shown in Fig. 1 of the drawings, which tends to space the leaves of the spring in the center a slight distance from each other, permitting relative movement of the leaves of the spring and producing a very efficient shock absorber. Shocks and jars are completely taken up in the spring structure and not transmitted to the vehicle body. This result is obtained due to the increased flexibility of the leaves of the spring, and the arrangement whereby the individual leaves are permitted to move relatively to each other.

Having thus described my invention, I claim:

1. A lubricating strip for leaf springs comprising a strip of fabric provided upon one side thereof with an adhesive and upon the other side with a layer of lubricant.

2. A lubricating strip for leaf springs comprising a strip of fabric provided upon one side thereof with an adhesive and upon the other side with a layer of dry lubricant.

3. A lubricating strip for leaf springs comprising a strip of fabric provided upon one side thereof with an adhesive and upon the other side with a layer of hard lubricant.

4. A lubricating strip for leaf springs comprising a strip of fabric provided upon one side thereof with an adhesive and upon the other side with a layer of lubricant comprising shellac, graphite and alum.

5. A lubricating strip for leaf springs comprising a strip of fabric provided upon one side thereof with an adhesive and upon the other side with a layer of hard lubricant comprising shellac, a dry lubricant and alum and a filler applied to the outer face of said layer of lubricant.

6. A lubricating strip for leaf springs comprising a strip of fabric provided upon one side thereof with an adhesive and upon the other side with a layer of hard lubricant comprising a dry lubricant and a watery binder adapted to harden under the action of heat and pressure.

7. A lubricating strip for leaf springs comprising a strip of fabric provided upon one side thereof with an adhesive and upon the other side with a layer of hard lubricant comprising graphite and a watery binder adapted to harden under the action of heat and pressure and a filler applied to the outer face of said layer of lubricant.

8. The herein-described method of producing a lubricating strip for leaf springs consisting in supplying a supporting strip, applying to one face thereof a watery binder containing a dry lubricant, placing the strip under pressure and subsequently baking the strip.

9. The herein-described method of producing a lubricating strip for leaf springs consisting in supplying a supporting strip, applying to one face thereof a paste formed by combining shellac, a dry lubricant and alum, placing the strip under pressure, baking the strip and applying to the opposite face of the strip an adhesive.

10. The herein-described method of producing a lubricating strip for leaf springs consisting in supplying a supporting strip, applying to one face thereof a paste formed by combining a watery binder with a powdered dry lubricant and a small percentage of alum, sprinkling upon the surface of the paste flake graphite, placing the strip under pressure, baking the strip and applying to the opposite face thereof an adhesive.

11. A lubricating strip for leaf springs comprising a supporting strip provided on one side thereof with an adhesive and upon the other side with a layer of lubricant.

12. A lubricating strip for leaf springs comprising a supporting strip provided on one side thereof with an adhesive and upon the other side with a layer of dry lubricant.

13. A lubricating strip for leaf springs comprising a supporting strip provided on one side thereof with an adhesive and upon the other side with a layer of lubricant comprising shellac, graphite, and alum.

14. A lubricating strip for leaf springs comprising a strip of material provided on one side with a layer of lubricant and means on the opposite side for securing it to one of the leaves of the spring.

15. An elliptical spring construction comprising a plurality of spring leaves, a lubricating strip arranged between each pair of leaves, and means for securing said strips to the face of one of said leaves, said strips terminating at a point removed from the center of the spring, whereby the leaves of the spring are slightly spaced from each other at the center.

16. In combination with an elliptical spring comprising a plurality of leaves, lubricating means comprising a plurality of lubricating strips arranged between the leaves at each end, said strips being provided with lubrication on one side and means on the opposite side for securing said strips to the leaves, said strips terminating at a point removed from the center of the spring.

17. A lubricating strip for leaf springs comprising a strip of material provided on one side with an anti-friction surface and means on the opposite side for securing it to one of the leaves of the spring.

In testimony whereof I hereunto affix my signature.

THOMAS S. HAMILTON.